July 6, 1954  A. JOHNSON ET AL  2,682,912
SEAT SLIDE LATCHING MECHANISM
Filed Sept. 7, 1950
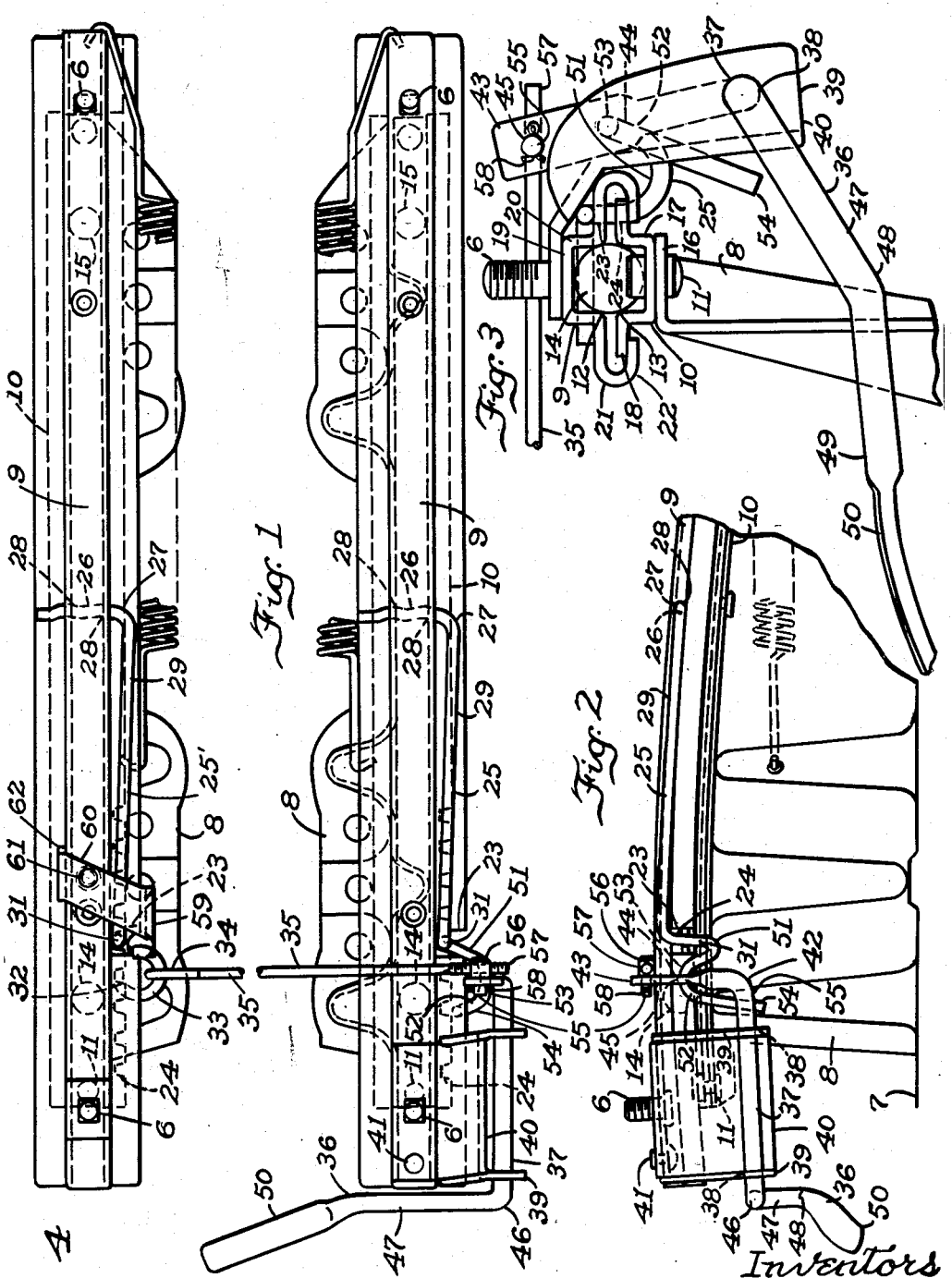
Inventors
Agnar Johnson
Harold H. Ring Patented July 6, 1954

2,682,912

UNITED STATES PATENT OFFICE 2,682,912

SEAT SLIDE LATCHING MECHANISM

Agnar Johnson and Harold H. Ring, Rockford, Ill., assignors to Atwood Vacuum Machine Company, Rockford, Ill., a corporation of Illinois Application September 7, 1950, Serial No. 183,562

18 Claims. (Cl. 155—14)

1

This invention relates to seat slides adapted for use in vehicles such as automobiles, and is more particularly concerned with improvements in the latching mechanism provided for releasably locking such slides in adjusted positions.

Various kinds of latches and latch operating means have been proposed heretofore. For example, there have been the sliding type latches like those illustrated in Crabb Patent 2,271,913, and there have also been the pivoted type latches like those shown in Lustig Patent 2,234,442. Other types have also been proposed but the sliding type and the pivoted type have been most commonly used. In all prior designs a separate spring means was invariably provided to hold the latch normally in locking position, and, of course, manually operable handle means of one kind or another was required which had to be connected in a suitable manner with the latch means and had to be so arranged that it could be operated reasonably handily from the driver's position on the seat. In any event, these prior designs have been more or less complicated and expensive and were subject to the further objection that with so many intermediate connections there was apt to be too much lost motion in the structure to enable as positive operation as desired, particularly when it is remembered that the movement of the latch on one slide mechanism on one end of the seat has to be transmitted through an intermediate linkage of some kind to the latch on the slide mechanism on the other end of the seat, thus, adding further opportunities for additional lost motion. Then too, because sheet metal stampings are used to such a large extent in the large scale production of seat slides for automotive use makes it impossible to operate within close limits as to tolerances, so that the difficulties mentioned are accordingly multiplied. In the copending application of Agnar Johnson, Serial No. 162,092, filed May 15, 1950, now Patent No. 2,636,545, there is disclosed a spring wire latch of simplified and novel design which, besides costing only a small fraction of what was involved in the cost of these other designs, avoids the objections inherent in those other designs and enables much more positive operation of the latches on the opposite ends of a seat, not only due to the improved design of the latches themselves but because of the greatly reduced opportunities for lost motion going with the use of these improved spring wire latches. It is the principal object of our invention to improve upon the construction disclosed in the aforesaid copending application.

2

In the construction of our present invention we have provided a spring wire latch which furnishes its own spring action, thus eliminating the necessity for extraneous spring means, similarly as in the construction of the copending application, and we have also provided a separate operating handle element formed from heavier wire or rod material and have so connected the crank end of this handle to the free end portion of the spring wire latch so that the latch can be released by pivotal movement of the handle but the handle movement is positively limited when a bent extremity of the latch strikes the pivot pin portion of the handle, thereby avoiding danger of the latch becoming disengaged and dislocated from its assembled relationship to the notched portion of the seat slide on which the spring wire latch is carried. The crank end of the handle is also arranged to be adjustably connected through a link with the latch on the other seat slide, so that both latches are arranged to be disengaged simultaneously when the handle is operated.

The invention is illustrated in the accompanying drawing in which—

Fig. 1 is a plan view of a seat slide assembly showing applied thereto a spring wire latch and operating handle therefor, made in accordance with our invention;

Fig. 2 is a side view of Fig. 1;

Fig. 3 is an end view of Fig. 1, on a larger scale, and

Fig. 4 is a plan view of the companion seat slide assembly for that shown in Fig. 1 and embodying a spring wire latch similar in general design to that shown in Figs. 1 to 3, but operable only by a wire link connection extending crosswise beneath the seat for connection with the operating handle.

The same reference numerals are applied to corresponding parts throughout the views.

Referring first to Figs. 1 to 3, the invention is illustrated as applied to a ball bearing type seat slide assembly like that disclosed in the copending application of Agnar Johnson, Serial No. 687,886, filed August 2, 1946, now Patent No. 2,622,940, there being, of course, two such devices provided in connection with each seat attached to the bottom of the seat by means of bolts 6 or in any other suitable manner, and secured to and supported upon the floor 7 on the legs or brackets 8, suitably of formed sheet metal construction, provided under each of the seat slide structures. Each seat slide structure comprises upper and lower longitudinally extending channel slide members 9 and 10, the member 9 carrying the bolts 6 previously mentioned and the member 10 being secured in any suitable manner to the tops of the supporting brackets 8, as by rivets 11. The slide members 9 and 10 are of stamped sheet metal construction and formed to provide channels 12 and 13 therein in which two bearing balls 14 and 15 operate to maintain these slide members in a normal spaced relationship and also guide the upper slide member 9 for movement in a straight line relative to the lower slide member 10. The lower member 10 has the rivets 11 entered through the web portion 16 of the channel 13 and has the side walls 17 of the channel bent outwardly to provide longitudinally extending flanges 18. In a similar way, the upper slide member 9 has the bolts 6 anchored in the web portion 19 of the channel 12 and has the side walls 20 of the channel bent outwardly to define longitudinally extending flanges 21, the outer edge portions of which are bent inwardly, as indicated at 22, under the flanges 18 on the lower slide member 10 to hold the parts in assembled relation. The seat slide construction so far described is substantially as disclosed in the last named copending application. However, in the present case, a notch 23 is defined by cutting away a small portion of the flange 21 on one side of the upper slide member 9 so as to expose selectively any one of the notches 24 provided in longitudinally spaced relation in the edge of the corresponding flange 18, whereby to enable engagement of the spring wire latch 25 selectively in any one of these notches 24 to lock the seat in any desired position of adjustment.

The spring wire latch 25, like the companion latch 25' on the other seat slide structure (Fig. 4), in accordance with the disclosure in the first mentioned copending application, is made from a single length of spring wire having one horizontal end portion 26 bent at right angles as at 27 and entered with a press fit in registering holes 28 provided in the side walls 20 of the channel 12 for anchorage of the rear end of the latch on the upper slide 9. The latch 25 extends horizontally forwardly from its anchored end 26 along the outside of the channel 12, as indicated at 29, to the notch 23 at which point the latch has a right angle downward bend, whereby to provide a short vertically extending latch pin portion 31 engageable in any one of the notches 24 in flange 18. To this extent the two spring wire latches 25 and 25' are substantially identical as can be seen by a comparison of Figs. 1 and 4. To this extent also the two spring wire latches 25 and 25' are like those shown in the first mentioned copending application. The latch 25', in line with said copending application, has another right angle bend at the lower end of the latch pin portion 31 and the portion 32 of the wire extending forwardly from this bend under the flanges 18 and 21, as indicated in dotted lines in Fig. 4, has a loop 33 formed therein for connection with the looped end 34 of a cross-link 35 that is provided to interconnect the latches 25 and 25' for joint operation.

The spring wire latch 25, in accordance with our invention, is arranged to be operated by means of a separate handle element 36 made from a single piece of heavier wire or rod material, the wire or rod material providing a pivot pin portion 37 intermediate the ends thereof that is received in aligned bearing holes 38 provided therefor in the parallel vertical flanges 39 on a sheet metal bracket 40. The latter is riveted to the top of the upper slide member 9, as indicated at 41, the adjacent bolt 6 being entered in a hole in the bracket 40 to hold it against turning with respect to the single rivet 41, so that only one rivet is needed. The wire or rod material of the handle member 36 has the one end portion bent upwardly at right angles to the pivot pin portion 37, as indicated at 42, to provide a crank portion 43 that is preferably flattened and has two holes 44 and 45 provided therein in vertically spaced relation. The wire or rod material of the handle member has the other end portion thereof bent at right angles, as indicated at 46 to provide the downwardly inclined handle portion 47, in which there is another bend intermediate the ends, as indicated at 48, to provide the more nearly horizontal handle extremity 49, the extreme end portion 50 of which is flattened and preferably slightly curved lengthwise to provide a handle grip. The spring wire latch 25 has a U-shaped bend 51 formed therein at the lower end of the latch pin portion 31 in a substantially vertical plane, which is nearly at right angles to the seat slides 9 and 10, and the outer arm of the U has a reverse U-bend 52 formed therein in a transverse plane, whereby to provide a crank pin portion 53 in the cross-portion of the last mentioned U for reception in the hole 44 in the crank 43, and also a stop pin portion 54 at the extremity of the last mentioned U, arranged to engage that portion 55 of the pivot pin portion 37 between the bracket 40 and the crank portion 43 of the handle member 36 to limit the retracting movement of the latch 25 and also the movement of the handle 50, whereby to prevent dislocating the spring wire latch 25 from its proper assembled relationship to the rest of the seat slide structure and rendering it inoperative.

The other hole 45 in the crank portion 43 of the handle member 36 receives the reduced shank portion 55 of a nut 56 that is threaded on the threaded extremity 57 of the cross-link 35, as indicated in Fig. 1, this nut 56 being adjusted inwardly or outwardly along the threaded portion 57 of the wire latch 35 to whatever extent is necessary and then having its reduced shank portion 55 entered in the hole 45 and retained by means of a cotter pin 58. In that way a take-up is provided to compensate for whatever slight differences are encountered in the assembling of seat slide structures in automobiles, so that the same positive operation of the two wire latches 25 and 25' can be obtained in every instance regardless of the inevitable differences in spacing of the seat slide structures.

In operation, these spring wire latches 25 and 25' can be assembled on seat slide structures with much less difficulty and at a small fraction of the cost involved with other designs of latch mechanisms, there being only the press-fit insertion of the end portion 26 in the holes 28, and, of course, the one-piece bent spring wire forming the body of each latch costs a small fraction of what was involved in the cost of the other designs of latches, where every latch invariably involved several parts, any one of which by itself, would cost as much as the one piece involved in the present design. Moreover, with the present one-piece construction, there is eliminated several pivotal connections, all of which involved a certain amount of play, and the present latch can accordingly be fitted more accurately to the seat slide structure with less likelihood of too much runout in the large scale production of seat slide structures for use on automobiles. The elimination of extra parts and the consequent elimination of lost motion going with the connections between such parts accounts to a large extent for the more positive action of these spring wire latches, and yet, since there is only the inherent spring tension in the latches themselves to be overcome in their release, there being no such friction as was involved in the sliding movement of a reciprocable latch or the turning movement of an oscillating latch, it follows that the present latches may be operated much more easily. The inherent spring tension holding the present spring wire latches normally in locked position insures keeping the latches fully engaged at all times; and inasmuch as there are no extraneous parts that are not affected by this spring tension, it is evident that there is less likelihood of the latches rattling when the car is in motion. The inter-connection of the handle member 36 and latch 25 makes the inherent spring tension in the latches 25 and 25' effective for returning the handle grip 50 to its normal position when the driver releases his hold on the handle grip. On the other hand, the extremity 54, coming into engagement with the portion 55 of the handle member 36 accomplishes the two-fold purpose of (a) positively limiting the release movement of the spring wire latches 25 and 25' so as to prevent dislocation of these latches from their proper assembled relationship to the rest of the seat slide structures and rendering them inoperative, and, (b) indicating to the operator by the limiting stop action that the spring wire latches have been fully released, so that there is no uncertainty as to when the seat is free to be adjusted in the one direction or the other. Due partly to the fact that there is the adjustment at 56—57 in the cross-link connection between the two spring wire latches 25 and 25', and, due partly to the fact that the handle grip 50 has appreciable leverage in relation to the length of the end portion 54 of the latch 25 that functions as the limiting stop, and some operators might pull upwardly on the handle grip 50 with sufficient force to spring the end portion 54 to such an extent as to permit dislocation of one or the other of the spring wire latches 25 and 25', it has been deemed advisable to provide in connection with the latch 25' a limit stop 59 adjacent the latch pin portion 31 thereof, positively limiting the release movement of the handle grip 50 by positively limiting the release movement of the latch 25' next to the cross-link connection 35. The stop 59 is in the form of a downwardly projecting lug on the outer end of a sheet metal bracket 60 that is riveted to the top of the upper slide 9, as at 61, and has a downwardly projecting flange 62 abutting the one side of the upper slide 9 on the far side away from the lug 59, thereby holding the bracket 60 against turning about the rivet 61 as a center and enabling the use of only a single rivet.

It is believed the foregoing description conveys a good understanding of the objects and advantages of our invention. The appended claims have been drawn to cover all legitimate modifications and adaptations.

We claim:

1. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, said spring wire latch member having a transversely extending crank pin portion on the end of the latch pin portion, and a manually oscillatable handle member pivotally supported on the same one of said support and slide elements with the latch member and having a crank portion pivotally engaged by said crank pin portion so as to deflect said latch member.

2. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, said spring wire latch member having a transversely extending crank pin portion on the end of the latch pin portion, and a manually oscillatable handle member pivotally supported on the same one of said support and slide elements with the latch member and having a crank portion pivotally engaged by said crank pin portion so as to deflect said latch member, said spring wire latch member also having a stop portion on the end of the crank pin portion in transverse relation thereto arranged to engage a portion of said handle member positively to limit deflection of said latch member in the release direction.

3. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, said spring wire latch member having a U-shaped portion formed on the end of the latch pin portion in a substantially vertical plane in transverse relation to the latch member and having an inverted U-shaped portion formed on the end of the first named U-shaped portion in a substantially vertical plane substantially parallel to the latch member, the cross-portion of the latter U serving as a crank pin, and a manually oscillatable handle having a pivot pin portion pivotally supported on the same one of said support and slide elements with the latch member, and having a crank portion straddled by the last mentioned U and pivotally engaged by the cross-portion thereof as a crank-pin, one arm of the last mentioned U being arranged to engage the pivot pin portion of the handle positively to limit deflection of said latch member in the release direction.

4. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, said spring wire latch member having a U-shaped portion formed on the end of the latch pin portion in a substantially vertical plane in transverse relation to the latch member and having an inverted U-shaped portion formed on the end of the first named U-shaped portion in a substantially vertical plane substantially parallel to the latch member, the cross-portion of the latter U serving as a crank pin, and manually operable means for deflecting said latch member, one arm of said last mentioned U being arranged to engage a portion of said manually operable means positively to limit deflection of said latch member in the release direction.

5. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, one of said spring wire latch members having a transversely extending crank pin portion on the end of the latch pin portion, a manually oscillatable handle member pivotally supported on the same one of said support and slide elements with the last named latch member and having a crank portion pivotally engaged by said crank pin portion so as to deflect said latch member, said handle member having an extension on the crank portion, and a link pivotally connected at one end with said extension and connected at its other end to the latch pin end of the other of said spring wire latch members.

6. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, one of said spring wire latch members having a transversely extending crank pin portion on the end of the latch pin portion, a manually oscillatable handle member pivotally supported on the same one of said support and slide elements with the last named latch member and having a crank portion pivotally engaged by said crank pin portion so as to deflect said latch member, said spring wire latch member also having a stop portion on the end of the crank pin portion in transverse relation thereto arranged to engage a portion of said handle member positively to limit deflection of said latch member in the release direction, said handle member having an extension on the crank portion, and a link pivotally connected at one end with said extension and connected at its other end to the latch pin end of the other of said spring wire latch members.

7. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, one of said spring wire latch members having a transversely extending crank pin portion on the end of the latch pin portion, a manually oscillatable handle member pivotally supported on the same one of said support and slide elements with the last named latch member and having a crank portion pivotally engaged by said crank pin portion so as to deflect said latch member, said handle member having an extension on the crank portion, a crank pin detachably pivoted in said extension and having a transversely perforated and internally threaded end portion, and a link having a threaded end portion adjustably threadedly connected with said crank pin in the internally threaded end portion thereof and connected at its other end to the latch pin end of the other of said spring wire latch members.

8. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, one of said spring wire latch members having a transversely extending crank pin portion on the end of the latch pin portion, a manually oscillatable handle member pivotally supported on the same one of said support and slide elements with the last named latch member and having a crank portion pivotally engaged by said crank pin portion so as to deflect said latch member, said handle member having an extension on the crank portion, a crank pin pivoted in said extension, and a link adjustably connected at one end to said crank pin and connected at its other end to the latch pin end of the other of said spring wire latch members.

9. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, one of said spring wire latch members having a U-shaped portion formed on the end of the latch pin portion in a substantially vertical plane in transverse relation to the latch member and having an inverted U-shaped portion formed on the end of the first named U-shaped portion in a substantially vertical plane substantially parallel to the latch member, the cross-portion of the latter U serving as a crank pin, a manually oscillatable handle having a pivot pin portion pivotally supported on the same one of said support and slide elements with the latch member, and having a crank portion straddled by the last mentioned U and pivotally engaged by the cross-portion thereof as a crank-pin, one arm of the last mentioned U being arranged to engage the pivot pin portion of the handle positively to limit deflection of said latch member in the release direction, said handle member having an extension on the crank portion, and a link pivotally connected at one end with said extension and connected at its other end to the latch pin end of the other of said spring wire latch members.

10. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, one of said spring wire latch members having a U-shaped portion formed on the end of the latch pin portion in a substantially vertical plane in transverse relation to the latch member and having an inverted U-shaped portion formed on the end of the first named U-shaped portion in a substantially vertical plane substantially parallel to the latch member, the cross-portion of the latter U serving as a crank pin, a manually oscillatable handle having a pivot pin portion pivotally supported on the same one of said support and slide elements with the latch member, and having a crank portion straddled by the last mentioned U and pivotally engaged by the cross-portion thereof as a crank-pin, one arm of the last mentioned U being arranged to engage the pivot pin portion of the handle positively to limit deflection of said latch member in the release direction, said handle member having an extension on the crank portion, and a link of elongated cylindrical form having one end portion threaded and adjustably threadedly connected with a crank-pin that is detachably pivotally mounted in said extension, said link extending to the other of said spring wire latch members and being pivotally connected at that end to that latch member.

11. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, manually operable means for deflecting said latch member, and a fixed limit stop provided on the same one of said support and slide elements with the latch member for positively limiting deflection of said latch member in the release direction.

12. A structure as set forth in claim 11 wherein said limit stop comprises a sheet metal bracket of generally U-shaped form inverted and straddling the element on which it is supported so that one arm of the U abuts one side of said supporting element and the other arm of the U is spaced from the other side of said supporting element and from the spring wire latch member to serve as a limiting abutment therefor, and means for fastening said bracket to said supporting element, comprising a single rivet.

13. A structure as set forth in claim 11 wherein said limit stop comprises a sheet metal bracket secured to the top of the supporting element and having a downwardly extending stop portion spaced from one side of said supporting element and from the spring wire latch member to limit outward deflection thereof.

14. A structure as set forth in claim 11, wherein said limit stop comprises a sheet metal bracket of generally U-shaped form inverted and straddling the element on which it is supported, so that one arm of the U abuts one side of said supporting element and the other arm of the U is spaced from the other side of said supporting element and from the spring wire latch member to serve as a limiting abutment therefor, and means for fastening the cross-portion of the U to said supporting element.

15. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, manually operable means for deflecting said latch member, and an elongated link having one end portion pivotally connected with said manually operable means and the other end portion pivotally connected with the latch pin end of the other of said spring wire latch members, at least one of said connections being adjustable to shorten or lengthen the link connection afforded by said link between said spring wire latch members.

16. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, manually operable means for deflecting said latch member, an elongated link having one end portion pivotally connected with said manually operable means and the other end portion pivotally connected with the latch pin end of the other of said spring wire latch members, at least one of said connections being adjustable to shorten or lengthen the link connection afforded by said link between said spring wire latch members, and a limit stop for positively limiting deflection of said latch members in the release direction.

17. Latching means for releasably locking a pair of spaced parallel supports for an adjustable seat, each support consisting of a movable seat supporting slide element and a stationary support element on which the slide is guided for fore and aft reciprocation, one of the said support and slide element having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, manually operable means for deflecting said latch member, and an elongated link having one end portion threaded and adjustably threadedly connected with a nut member that is pivotally connected with said manually operable means, and having the other end portion pivotally connected to the latch pin end of the other of said spring wire latch members.

18. Latching means for releasably locking a pair of spaced parallel supports for an adjustable seat, each support consisting of a movable seat supporting slide element and a stationary support element on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member for each of said seat supports, each of said latch members being, respectively, fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, manually operable means for deflecting said latch member, an elongated link having one end portion pivotally connected to the latch pin end of the other of said spring wire latch members and having the other end portion threaded and adjustably threadedly connected with a nut member that is pivotally connected with said manually operable means, and a limit stop for positively limiting deflection of said latch members in the release direction.

(References on following page)

References Cited in the file of this patent

UNITED STATES PATENTS

| Number | Name | Date |
|---|---|---|
| 1,962,789 | Simpson et al. | June 12, 1934 |
| 2,014,553 | Browne | Sept. 17, 1935 |
| 2,149,946 | Whedon et al. | Mar. 7, 1939 |
| 2,286,946 | Ball | June 16, 1942 |

FOREIGN PATENTS

| Number | Country | Date |
|---|---|---|
| 4,792 | Great Britain | of 1903 |
| 326,351 | Great Britain | Mar. 13, 1930 |